United States Patent [19]
Ratliff

[11] Patent Number: 5,415,365
[45] Date of Patent: May 16, 1995

[54] HIGH PERFORMANCE AMPHIBIOUS AIRCRAFT

[76] Inventor: Paul D. Ratliff, 7595 County Rd. 28, Clanton, Ala. 35045

[21] Appl. No.: 148,558

[22] Filed: Nov. 8, 1993

[51] Int. Cl.⁶ .................. B64C 35/00; B64C 35/02
[52] U.S. Cl. .................. 244/101; 244/105; 244/106; 114/271; 114/272
[58] Field of Search ........... 244/100 A, 101, 105, 244/106; 114/271, 272

[56] References Cited

U.S. PATENT DOCUMENTS

| | | | |
|---|---|---|---|
| 1,875,190 | 8/1932 | Collins | 114/272 |
| 2,272,661 | 2/1942 | Finley | 114/272 |
| 2,964,271 | 12/1960 | Strawn | 244/101 |
| 3,136,505 | 6/1964 | Fleury | 244/106 |
| 3,190,582 | 6/1965 | Lippisch | |
| 3,614,032 | 10/1971 | Purceil, Jr. | 244/105 |
| 3,627,235 | 12/1971 | Lippisch | 244/105 |
| 4,004,534 | 1/1977 | Allison | 114/56 |
| 4,691,881 | 9/1987 | Gioia | 244/101 |
| 4,827,862 | 5/1989 | Enriquez | 114/272 |
| 4,944,240 | 7/1990 | Morris | 114/271 |
| 5,269,249 | 12/1993 | Micheletti | 114/272 |
| 5,273,238 | 12/1993 | Sato | 244/105 |
| 5,277,383 | 1/1994 | Tormakhov et al. | 244/105 |

FOREIGN PATENT DOCUMENTS 3029574  2/1982  Germany .......................... 244/106

*Primary Examiner*—Andres Kashnikow
*Assistant Examiner*—Virna Lissi Mojica
*Attorney, Agent, or Firm*—Veal & Associates

[57] ABSTRACT

An amphibious aircraft, capable of high speed maneuverability on the surface of the water, utilizes a aerodynamic platform to generate lift and to define a tunnel with a pair of central sponsons extending inwardly of the wings of the aircraft longitudinally of the platform which supports the cockpit and propulsion system.

8 Claims, 5 Drawing Sheets

HIGH PERFORMANCE AMPHIBIOUS AIRCRAFT

FIELD OF THE INVENTION

The present invention relates to aircraft generally and more particularly to amphibious aircraft. In greater particularity, the present invention relates to integrated hull aircraft for amphibious usage wherein the sponsons of the aircraft support a central airfoil with laterally extending wings such that the central airfoil and sponsons create a highly stable and maneuverable vehicle during takeoff and landings.

BACKGROUND OF THE INVENTION

The history of aviation is replete with various amphibious aircraft capable of taking off and landing on water. The famed PBY's of World War II and the pontoon supported planes flown by the "Bush" pilots of Alaska have always festooned the popular lore of aviation and are easily identifiable to the public and the aviation community. Yet, these aircraft are of limited utility and are subject to usage limitations which have curtailed their widespread application and have seen them fall into disfavor particularly in the military.

Heretofore, in this field, there has been no successful marriage of stability and maneuverability in amphibious aircraft. The seaplane of PBY design was a highly stable water and air craft, yet it was a ponderous vehicle to maneuver. The Bush pilots' aircraft have a center of gravity well above the pontoons which create lateral instability when the aircraft executes a high speed turn on water. See, for example, U.S. Pat. No. 2,950,486.

In the patent literature, A. M. Lippisch in U.S. Pat. Nos. 3,190,582 and 3,627,235 proposed the use of pontoons mounted on the outer extremities of an amphibious aircraft. Lippisch described his vehicle as a high-speed aircraft, low-speed boat, and as a ground effect flying vehicle. Lippisch's designs were so inherently transversely unstable during a high-speed turn while on water that the inventor mounted auxiliary floats 19 and auxiliary wings 20 to attempt to stabilize banking maneuvers.

Accordingly, there remains a need for a stable, maneuverable, amphibious vehicle capable of high-speed operation on the water and in the air.

SUMMARY OF THE INVENTION

It is the principal object of the present invention to provide an aircraft design which provides a stable and maneuverable platform for use on water as well as in the air.

It is a further object of the present invention to increase the load-carrying capacities of amphibious aircraft.

These and other objects and advantages are accomplished through the marriage of aviation technology with the hydrodynamics of tunnel hull boats. As is documented in the literature, e.g. U.S. Pat. No. 4,004,534, such boats have a tendency to flip end over end at high speeds inasmuch as they are not designed for flight but rather must remain in contact with the water to remain stable.

My invention alters the tunnel hull boat by increasing the lift such that my apparatus is capable of lifting free of the water in a stable mode at speeds above which the tunnel boat can operate, yet can maneuverably operate below takeoff speed on the water at speeds heretofore unheard of for an amphibious aircraft.

BRIEF DESCRIPTION OF THE DRAWINGS

Aircraft embodying features of my invention are depicted in the accompanying drawing which form a portion of this disclosure and wherein.

DESCRIPTION OF THE PREFERRED EMBODIMENT

Figure 1:
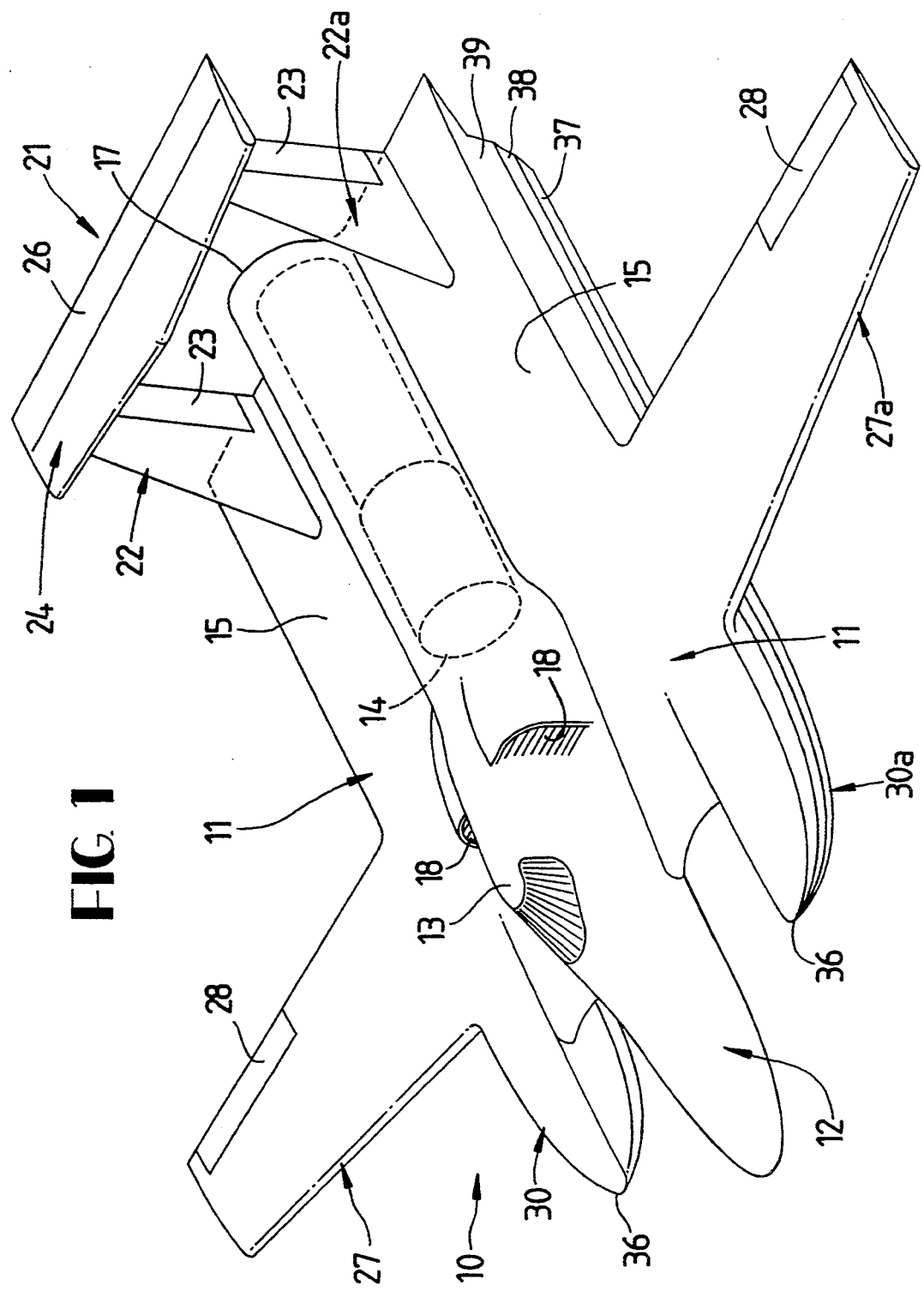
FIG. 1 is a perspective view of such an aircraft.

Referring to the drawings for a clearer understanding of the invention, it will be seen that the aircraft, indicated generally at 10, utilizes a high surface area platform 11 which supports and is integrated with the fuselage 12 of the aircraft. The fuselage 12, of course, houses the cabin area 13 forwardly and the engine compartment 14 rearwardly. Neither of these areas of the fuselage is shown in any specific detail inasmuch as the internal configuration thereof is not germane to the invention, there being a number of variants of cabin and engine components which would suffice. The cabin 13 is further bounded by the windows 16 which permit the crew of the aircraft to see out of the cabin 13. The engine compartment 14 terminates at the exhaust nozzle 17 at the rear of the aircraft and may receive air for combustion purposes via scoops 18 configured alongside the fuselage 12.

An analysis of the aircraft by the aerospace engineering department of a state university has recommended that propulsion be provided in a prototype aircraft by a directed fan unit developed by Moller International of Davis, Calif., comprising two, two-foot diameter seven-blade counter-rotating variable pilot fans, each powered by an air-cooled rotary engine producing about 150 horsepower. Such a propulsion system would provide sufficient thrust to enable flight at the desired conditions. Specific propulsion systems for varying size aircraft are a matter of aeronautical engineering which are readily adapted to the present invention and thus are not discussed further. Likewise, conventional fuel supply systems for the propulsion unit and control components are within the general knowledge of the artisan in the field, therefore, specific details as to such components of the aircraft are not discussed herein.

Referring again to the figures, it may be seen that an empennage assembly 21 is mounted to platform 11 at the rear of the aircraft 10. The empennage assembly 21 includes a pair of vertical fins 22 and 22a, each having a control surface or rudder 23, affixed at the rear of the fins 22, 22a. A horizontal stabilizer 24 is mounted to the tops of fins 22, 22a and a control surface or elevator 26 is positioned at the rear thereof. Extending outwardly from the platform 12 and forming an essentially continuous upper surface therewith are a pair of wings 27, 27a which carry the conventional control surface or aileron 28 and flap 29. Each of the control surfaces operate in the same manner as on a conventional aircraft and in the prototype may be operated by the pilot using a system similar to that used in a Cessna 172 aircraft. Again, the type of control system is a matter of design choice rather than a principle feature of the present invention.

The platform 11 is integrally formed with a pair of opposing sponsons 30 and 30a. The sponsons 30, 30a are located inwardly of the wings 27, 27a and extend the full length of the platform. Each sponson decreases in its vertical dimension from the front of the platform 11 to the rear such that a "tunnel" formed by the underside 35 of platform 11 and the sponsons 30, 30a with a rearwardly diminishing volume is created. Similarly, the sponsons when resting on a level surface provide the aircraft with a slight nose-up angle of attack.

Figure 2:
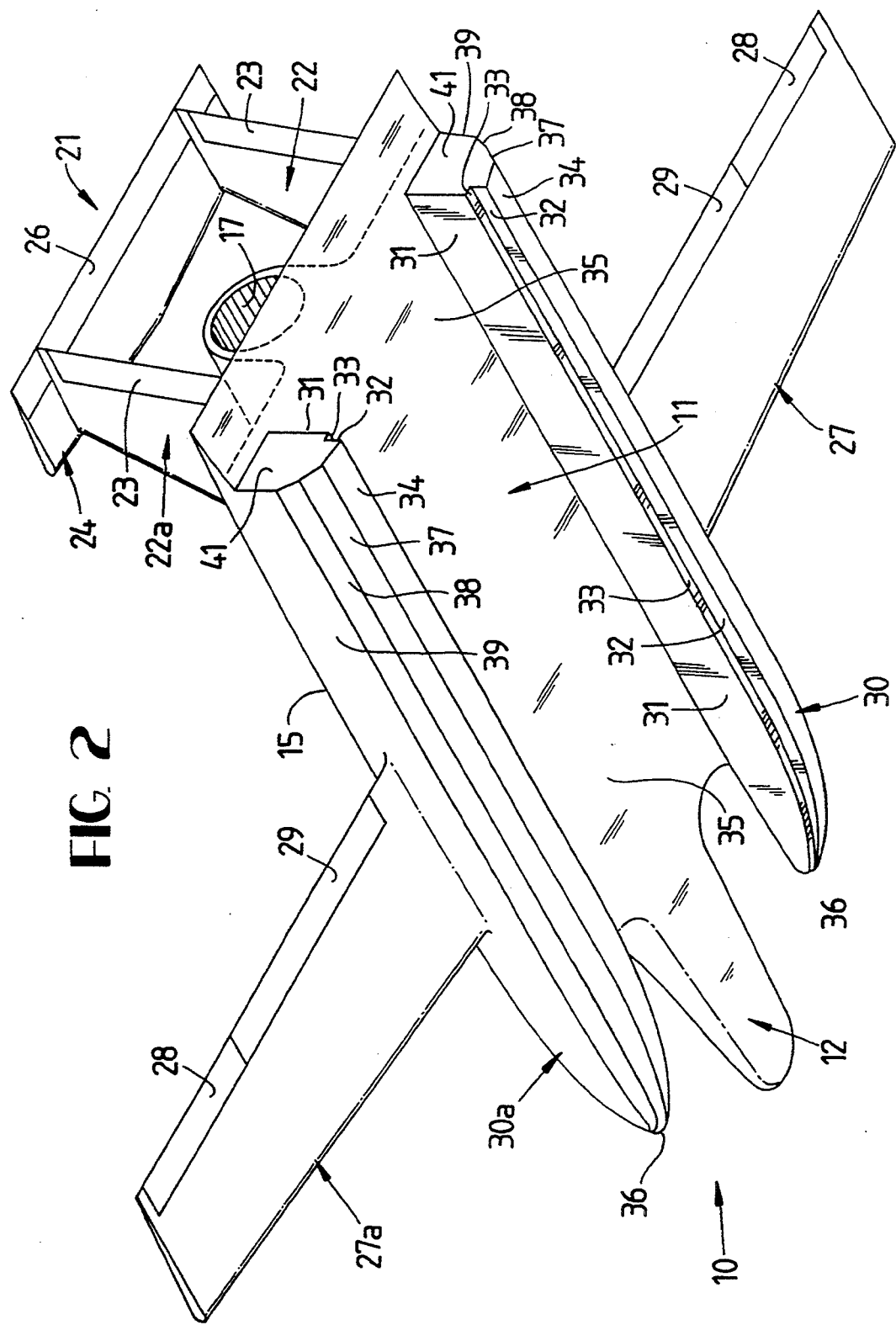
FIG. 2 is a bottom perspective view of the aircraft.
Figure 3:
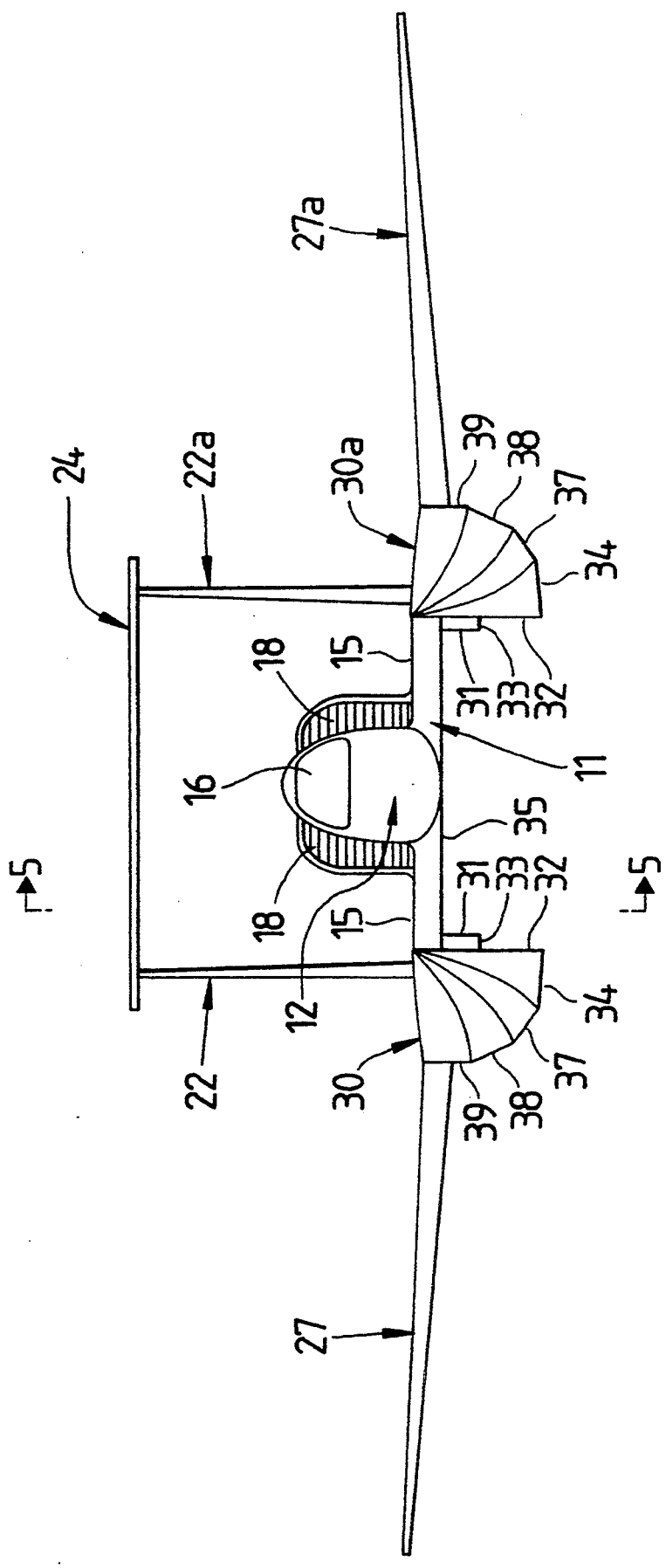
FIG. 3 is a front elevational view of the aircraft.
Figure 4:
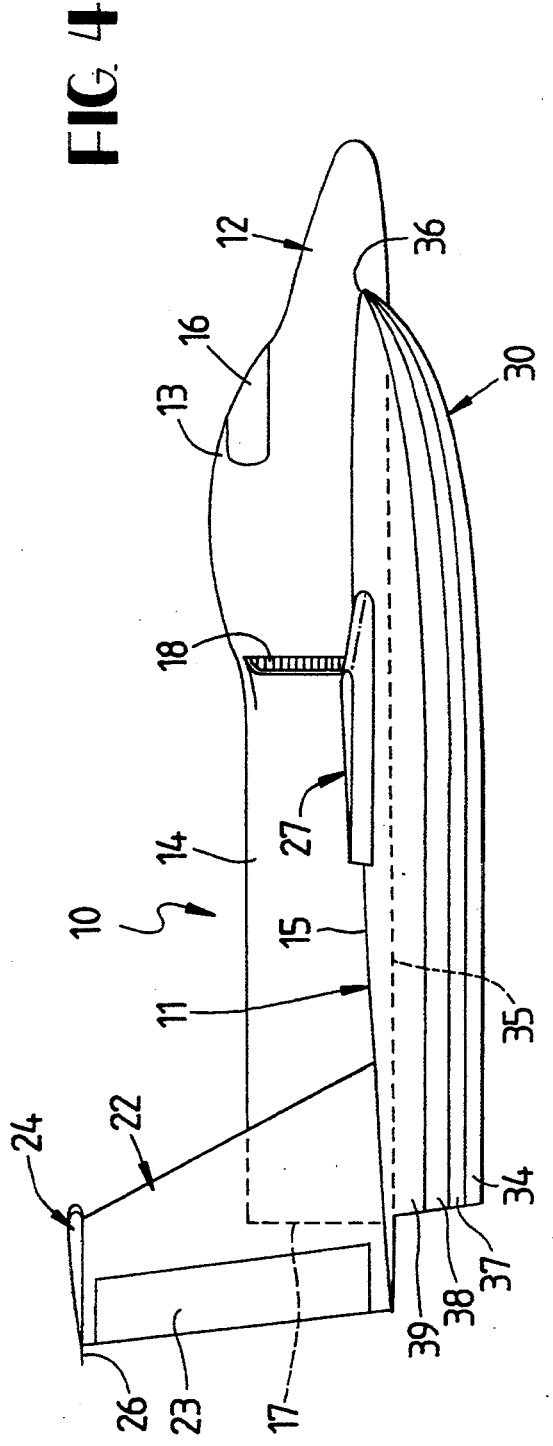
FIG. 4 is a side elevational view of the aircraft.
Figure 5:
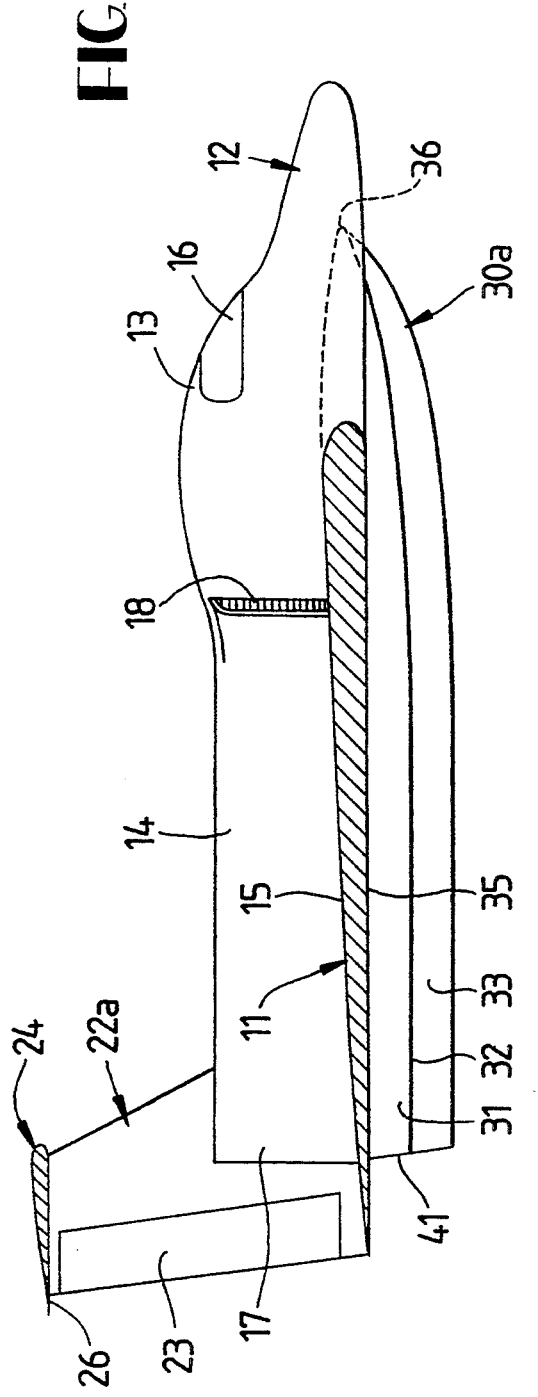
FIG. 5 is a sectional view taken along line 5—5 of FIG. 3.
Figure 6:
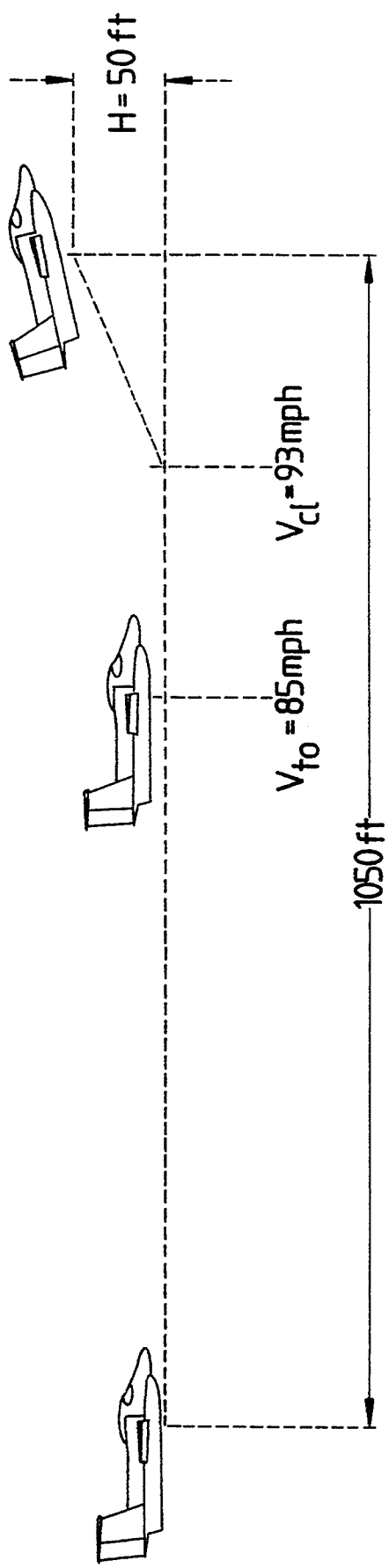
FIG. 6 is a graphic illustration of the take-off parameters of the aircraft.

As may be seen in FIG. 2, each sponson has a stepped inner surface defined by vertical surfaces 31 and 32 and horizontal surface 33. Vertical surface 32 terminates at a bottom surface 34 which defines the underside of the sponson and extends forwardly and upwardly to define a bow 36 of the sponson. Outwardly of surface 34 adjacent surfaces 37, 38 and 39 define the exterior of the sponson, each surface being angled from the surface adjacent thereto and connected longitudinally to form a continuous faceted outer surface.

Platform 11 is an airfoil designed to provide lift, therefore, it includes a curved upper surface 15 which tapers to a reduced thickness at the rear of the airfoil as may be seen in FIG. 2. As also noted in FIG. 2, the sponsons 30, 30a terminate in a blunt rear surface 41 to define the back end of the "tunnel".

It will be appreciated that for an aerodynamically stable aircraft, the appropriate location of the components must be accomplished. Table 1 sets forth the weight and center of gravity of the various components of the prototype aircraft with respect to the front of the aircraft.

The result is a center of gravity at 8.6 feet from the front of the aircraft. Fuel is contained within bladder-type tanks inside the sponsons centered at the center of gravity.

In operation, it should be understood that the weight of the aircraft and its contents are such that at rest, the sponsons are submerged to a degree that only a very small clearance is provided between the bottom of the platform 11 and the surface of the water. As the aircraft taxis and gains speed, lift generated by the airfoils, by the compression of air within the diminishing volume tunnel, and by the relative motion between the sponson and the water raises the aircraft to a taxiing height proportional to its forward velocity. As the velocity increases, the aircraft rises to the point at which step surface 33 is above the surface of the water and only bottom surface 34 provides hydrodynamic lift. At this speed, the aircraft has the same handling and stability characteristics of a tunnel hull racing boat, except that the horizontal stabilizers and other control surfaces enable the pilot to avoid an unwanted nose-up pitch. Lateral stability provided by the inner surface of the sponsons allow sharp turns of the aircraft at speeds approaching take-off speed without fear of overturning the aircraft. Take-off speed of 85 mph has been calculated for the prototype.

It will be evident that, due to the lateral stability of the aircraft, the pilot may elect to gain speed by accelerating in a circle to near take-off speed before a brief straight take-off run during which the aircraft can accelerate and begin flight in a stable attitude. It is believed that such maneuvers have heretofore been impossible, therefore, it is evident that a superior amphibious vehicle is provided by the present invention.

| COMPONENT | COMPONENT WEIGHTS AND RELATIVE C.G. LOCATIONS | |
|---|---|---|
| | WEIGHT (lbs) | C.G. LOCATION (ft) |
| Platform with Sponsons | 425.0 | 8.0 |
| Cockpit (with pilot) | 300.0 | 5.5 |
| Engines (with duct) | 200.0 | 9.5 |
| Wings | 165.0 | 11.0 |
| Horizontal Stabilizer | 36.0 | 15.5 |
| Fins | 55.0 | 15.2 |
| Fuel | 100.0 | ? |

In large measure, this is due to the combined effort of the vertical surface 31-32 and the faceted surfaces 37-39. As the aircraft turns while in the water, centrifugal force applied to the aircraft opposes the motion into the curve. Vertical surface 31 is urged normally of its surface against the water, however, this portion of the sponson offers a large surface area against which the water resists lateral movement. Likewise, a component of the centrifugal force vector loads the outer side of the sponson in the direction opposite the curve tending to sink the sponson, however, the large surface area of the faceted surface is aligned normal to the vector, thus presenting a flat surface which must be urged into the water. The amount of water to be displaced by surfaces 31 and 37-39 requires greater force than the centrifugal force generated in the turn, thus the aircraft remains stable.

While I have shown my invention in several embodiments, it will be obvious to one skilled in the art that it is not so limited but is susceptible to various changes and modifications without varying from the spirit of the invention.

What is claimed is:

1. An amphibious aircraft having a weight to volume ratio creating an overall density less than water, comprising in combination: an airfoil platform having a longitudinally tapered thickness from a forward portion thereof to a rear portion thereof such that lift is provided by said airfoil platform, a fuselage integrally formed with said airfoil platform and defining a continuous surface therewith., defining a cabin extending upwardly from and located along the longitudinal centerline of the platform, a pair of opposed sponsons affixed to the underside of said platform and extending over substantially the entire length of said platform to define a diminishing volume tunnel with said platform, said sponsons being partially defined by opposing substantially vertical stepped surfaces, a bottom hydrodynamic lift surface and an intermediate hydrodynamic lift surface each being substantially perpendicular to adjacent vertical stepped surfaces, and each sponson of said pair having a faceted outer surface, a pair of wings extending laterally from said platform and forming a substantially continuous upper surface therewith, means for providing propulsion to said aircraft and means for controlling the motion of said aircraft.

2. An aircraft as defined in claim 1 wherein said sponsons include an upturned bow portion forward of said platform and diminished in height toward the rear of said platform.

3. An aircraft as defined in claim 2 wherein the underside of said platform is substantially planar intermediate said sponsons.

4. An aircraft as defined in claim 1 wherein said outer faceted surface provides a wide area for dispersing lateral forces against the surface of the water and said vertical walls present a high surface area opposing movement through the water normal to said surface.

5. An amphibian aircraft comprising a central platform having an upper surface in the shape of an airfoil and a substantially planar lower surface, a fuselage mounted superiorly centrally on said platform, a pair of sponsons integrally formed beneath said platform including substantially vertical inner sponson surfaces and faceted outer sponson surfaces, each sponson having a bottom hydrodynamic lift surface and an intermediate hydrodynamic lift surface formed on said vertical inner sponson surface, a pair of wings forming a laterally continuous surface from said upper surface and extending outwardly from said central platform, an empennage affixed to said central platform, and a plurality of control surfaces providing lateral and vertical directional control.

6. An aircraft as defined in claim 5 wherein said central platform is a lift providing airfoil tapering from a thicker forward portion to a thin rear portion extending beyond said sponsons.

7. An aircraft as defined in claim 6 wherein said sponsons are defined by inwardly facing generally vertical wall surfaces and faceted outer surfaces.

8. An aircraft as defined in claim 7 wherein said sponsons include an upturned bow portion forward of said platform and diminished in height toward the rear of said platform.

* * * * *